Jan. 1, 1952             B. WELTE             2,580,868
DIRECTIONAL AND PRESSURE CONTROL VALVE
FOR HYDRAULIC STRAIGHTENING PRESSES
Filed June 10, 1947                            4 Sheets-Sheet 1
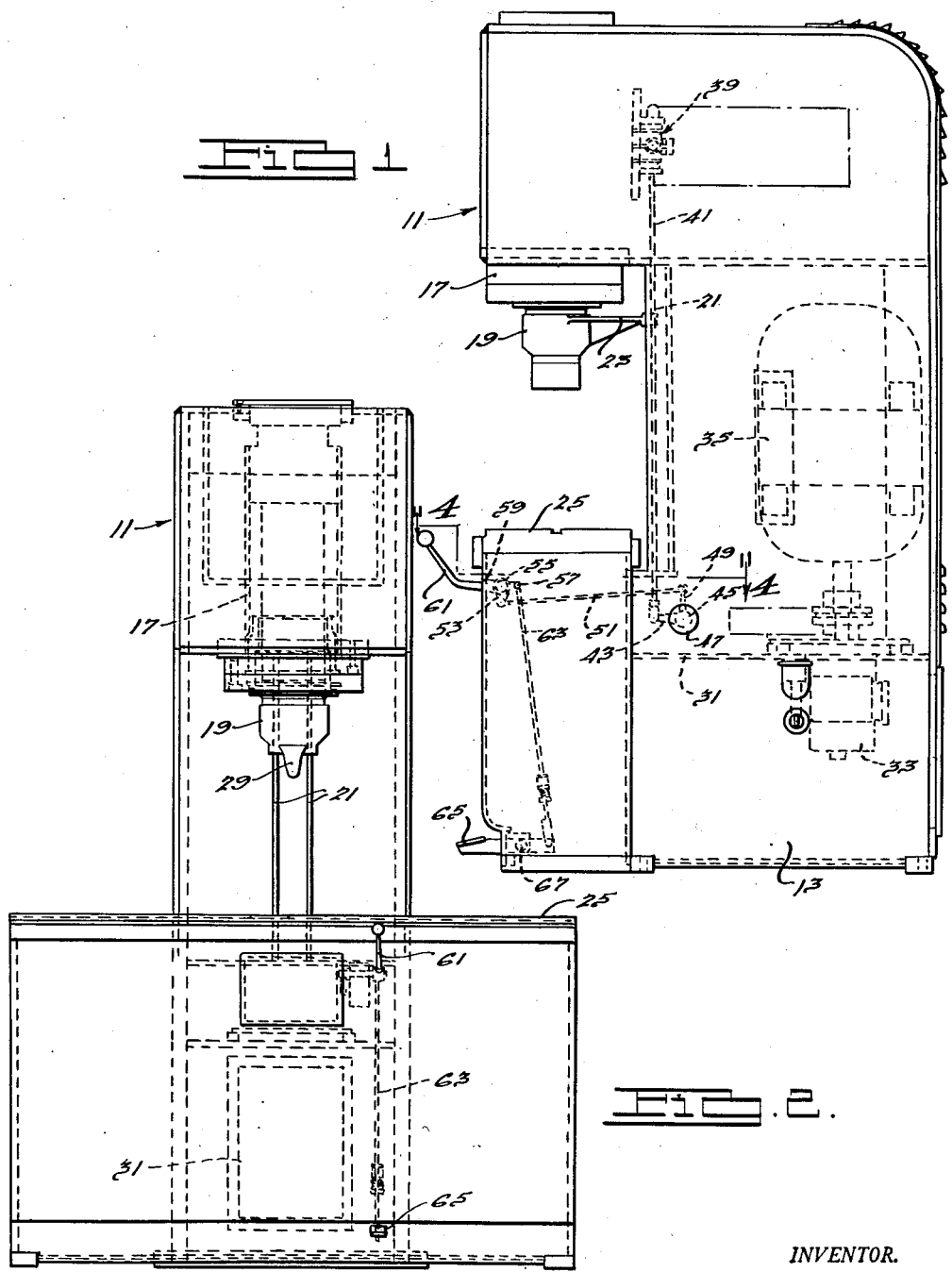
INVENTOR.
Benedict Welte.
BY
Harness Dickey-Pierce
ATTORNEYS.

INVENTOR.
Benedict Welte.
BY
Harness, Dickey-Pierce.
ATTORNEYS.

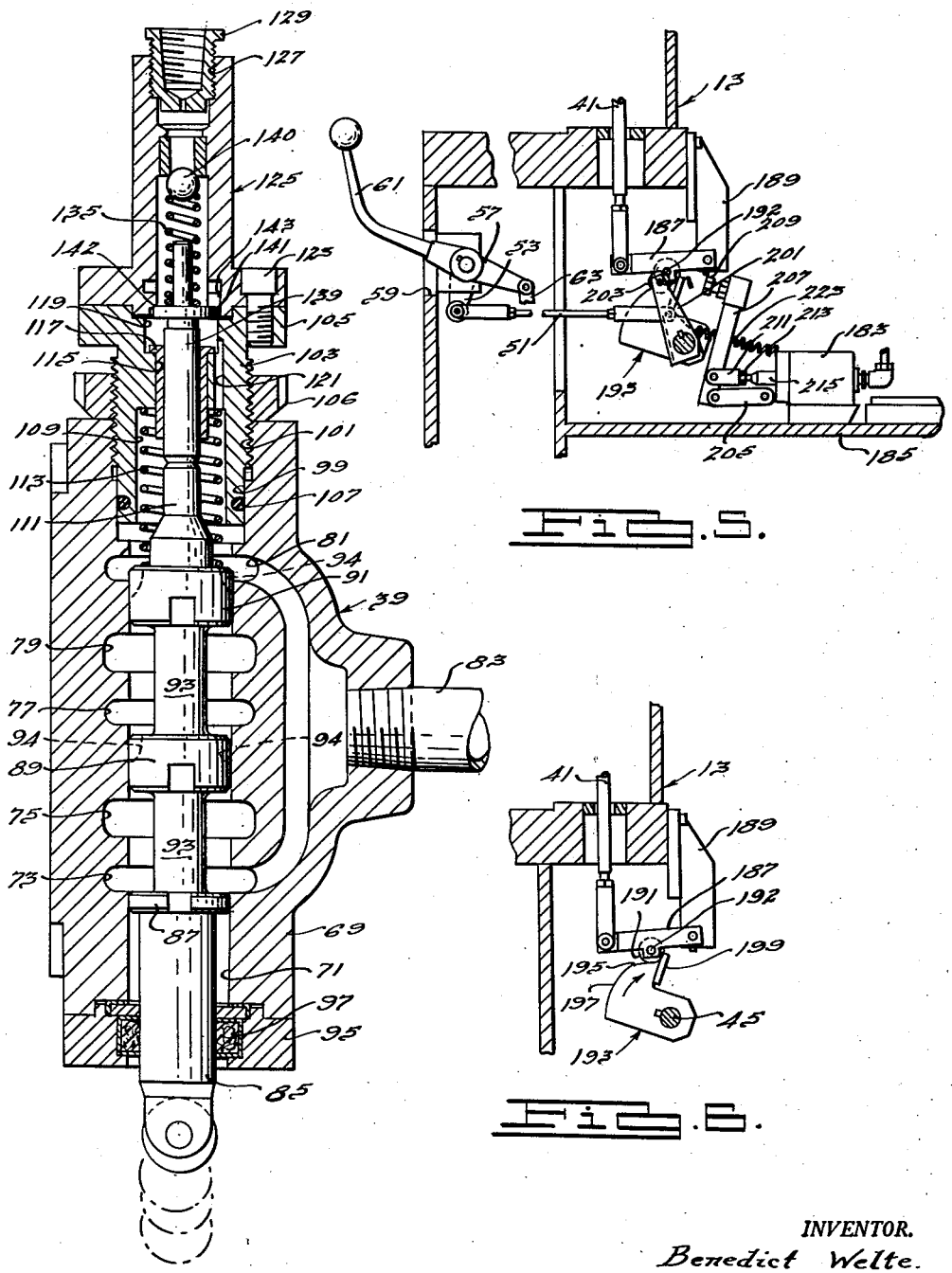

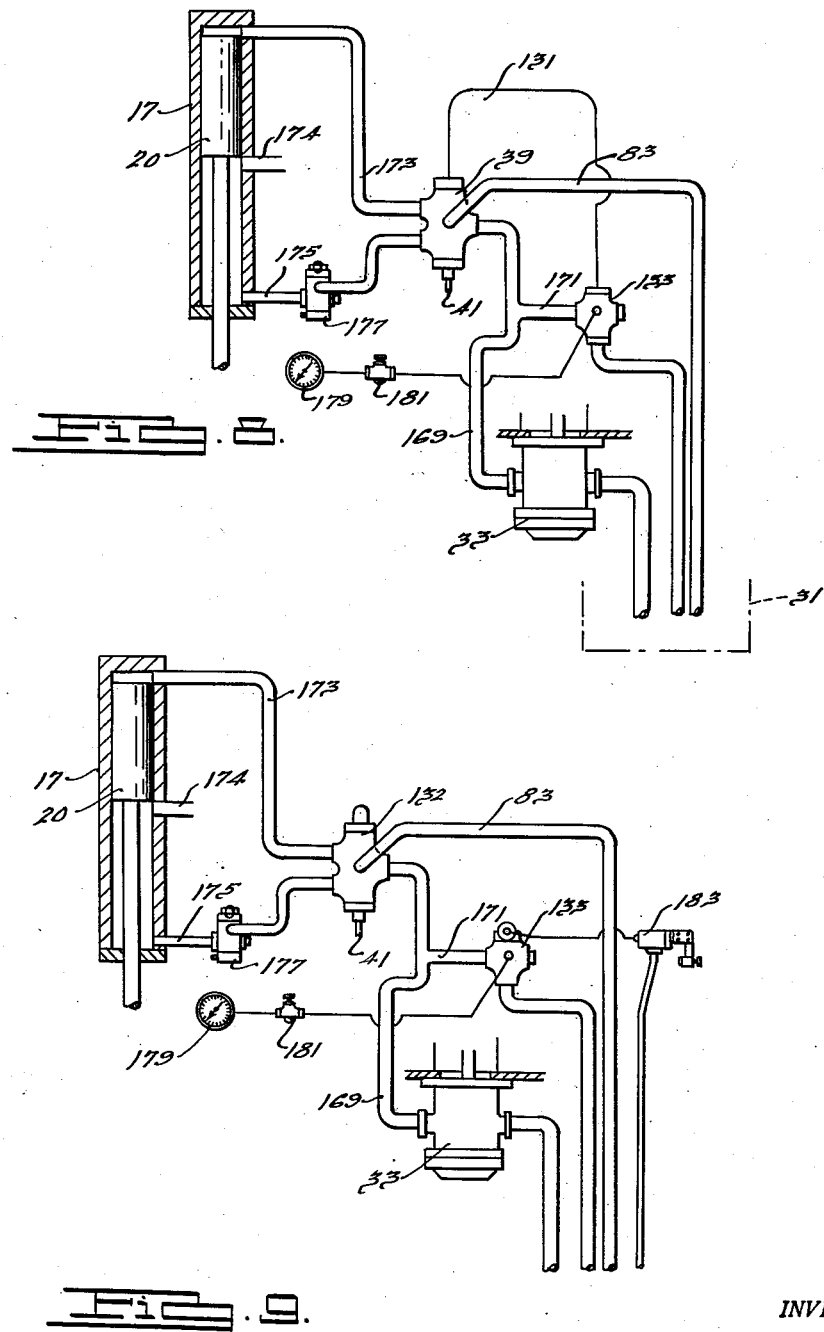

UNITED STATES PATENT OFFICE 2,580,868

DIRECTIONAL AND PRESSURE CONTROL VALVE FOR HYDRAULIC STRAIGHTENING PRESSES

Benedict Welte, Lake Orion Township, Oakland County, Mich., assignor to Colonial Broach Company, Warren Township, Mich., a corporation of Delaware Application June 10, 1947, Serial No. 753,779

1 Claim. (Cl. 277—60)

This invention relates generally to straightening presses, and more particularly to an improved type hydraulic straightening press and novel control means therefor.

It is an object of this invention to provide a straightening press of the type having a hydraulically-operated piston adapted to carry a working element for straightening a workpiece supported on a table of the press in which improved hydraulic control means are provided for controlling the direction of movement of the piston as well as the applied force of the piston.

It is a further object of this invention to provide a control system for a straightening press of the aforementioned type whereby a single manually operated control member controls simultaneously the direction of movement of the aforementioned piston as well as the pressure exerted thereby on a workpiece.

It is a further object of this invention to provide a valve unit capable of controlling the direction of movement of an actuating piston of a straightening press or the like and simultaneously controlling the pressure applied to the piston without affecting the direction of movement of the piston.

It is a still further object of this invention to provide a hydraulic-type straightening press which is simple in operation, rugged in construction, and inexpensive to manufacture.

These and other objects of this invention will become apparent from the following detailed description taken in conjunction with the accompanying drawings in which:

Figure 1 is a side elevational view of a straightening press embodying features of one embodiment of this invention;

Fig. 2 is a front elevational view of the structure illustrated in Fig. 1;

Fig. 5 is a reduced sectional view taken along the line 5—5 of Fig. 4;

Fig. 6 is a reduced sectional view taken along the line 6—6 of Fig. 4;

Fig. 7 is a sectional view of a reversing and pressure control valve unit for use in the embodiment of the invention illustrated in Fig. 1;

Fig. 8 is a schematic diagram of the hydraulic system of the embodiment illustrated in Fig. 1; and Fig. 9 is a schematic diagram of the hydraulic system of the embodiment illustrated in Figs. 4, 5, and 6.

Figure 3:
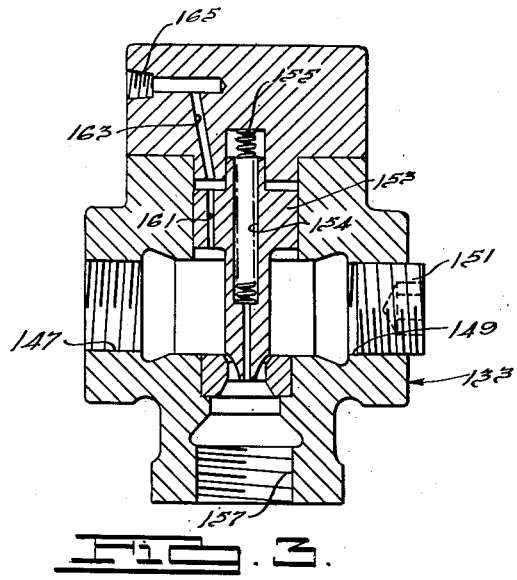
Fig. 3 is an enlarged sectional view of the pressure relief valve in the hydraulic circuit of this invention.

Referring now to the drawings, and more particularly to Figs. 1 and 2, it will be seen that a straightening press, generally indicated at 11, of a more or less conventional shape and design is provided with a generally C shaped frame 13. The upper end of the frame 13 supports a conventional hydraulic cylinder 17 having a head 19 fixed to a piston rod which is connected to a piston 20, within the cylinder. Hardened steel ways 21 are mounted in the front face of the frame 13, below the cylinder 17, and a guide member 23, slidable in the ways 21, is secured to the lower end of the head 19. A stationary worktable 25, on which a fixture (not shown) may be mounted for supporting a workpiece to be straightened, is positioned beneath the head. A work engaging or straightening element 29 is provided on the head 19.

Mounted within the frame is pump motor 35 and a fluid pump 33 for pumping fluid from a tank 31 into the cylinder 17 as will be hereinafter brought out.

Mounted in the upper end of the frame 13 for controlling the movement of the head 19 is a reversing and pressure control valve unit generally indicated at 39 which will be described hereinafter in detail. The valve unit 39 is actuated by means of a vertically extending rod 41 which is secured to the lower end of an axially slidable valve member within the unit 39. The lower end of the rod 41 is pivotally connected to a lever 43 which in turn is fixedly connected to a horizontal shaft 45 rotatably mounted in suitable bearing means 47 carried by the opposite sides of the frame 13. Connected to the shaft 45 is a second lever 49 which is pivotally connected to a link 51 extending forwardly from the lever 49 and having its forward end connected to a lever 53 fixed to a short horizontal shaft 55, rotatably mounted on the frame 13 directly below the worktable 25. Likewise mounted on the shaft 55 is a crank 57, the forward end of which extends through an aperture 59 in the forward wall of the frame 13 and has a handle member 61 connected thereto. The rear end of the crank 57 extends rearwardly beyond the shaft 55 and is pivotally connected to a link 63, the lower end of which is adjustably and pivotally connected to a foot pedal 65. The pedal 65 is pivotally mounted on a horizontal shaft 67 in the same manner as is the member 57 on the shaft 55, so that the valve unit 39 may be actuated either by movement of the handle 61 or the foot pedal 65, whichever is the most convenient to the operator of the press.

It will thus be seen, that when the handle 61, or the foot pedal 65, is pressed downwardly the linkage will cause the rod 41 to move upwardly and actuate the valve unit 39 in a manner that will be hereinafter described.

The reversing and pressure relief valve unit 39 is shown in detail in Fig. 7, wherein it can be seen that the valve unit comprises a housing 69 having a central axial bore 71 therethrough. Intermediate the ends of the bore 71 the housing is provided with a plurality of annular grooves 73, 75, 77, 79 and 81 which communicate with the central bore 71 and which communicate with outlet and inlet ports in the valve body in a conventional manner. The groove 75 communicates with a conduit 175, which communicates with the lower end of the cylinder 17, as best shown in Fig. 8. The groove 79 communicates with a conduit 173 leading to the upper end of the cylinder 17, the groove 77 is connected to the outlet of pump 33 by a conduit 169, and grooves 81 and 73 communicate with an outlet conduit 83 which returns to the tank 31.

Axially slidable within the bore 71 of the housing is a movable valve spool 85 having three bore fitting, axially spaced, cylindrical lands 87, 89 and 91 formed thereon and joined by reduced neck portions 93 so as to permit the flow of fluid between the lands. It will be noted, that the effective length of lands 89 and 91 is reduced by notches 94 and is less than the distance between the housing grooves 79 and 81, and 75 and 77, so as to allow overtravel of the lands 89 and 91 between the ports, for a reason which will hereinafter appear. The lower end of the housing 69 is recessed to receive a cover or cap member 95 therein which is provided with a conventional oil seal 97 to prevent leakage of fluid from the housing 69.

The upper end of the housing 69 is recessed at 99 and the upper end of the recess 99 is threaded at 101. A sleeve 103 is threaded into recess 99 and a lock nut 106 is provided for locking the sleeve 103 in a desired position with respect to the housing 69. The lower end of the sleeve 103 is grooved to receive a conventional O-ring seal 107 which prevents the leakage of fluid from the housing around the outer periphery of the sleeve 103. The lower end of the sleeve 103 likewise is formed with a recess 109 into which the upper reduced end 111 of the valve spool 85 extends. A coil spring 113 surrounds the upper end 111 of the valve spool with its lower end abutting against the upper face of the land 91, and its upper end abutting against the upper wall of the recess 109 so as to return the valve spool 85 to its normal down position when upward pressure on rod 41 is relieved.

The sleeve 103, above the recess 109, is provided with an aperture 115 which receives a flanged bushing 117. Above the aperture 115 the sleeve 103 is provided with an enlarged recess 119. Parallel to the aperture 115 and spaced radially therefrom is an axial bore 121 which connects the recesses 119 and 109 so as to permit a flow of fluid from the recess 119 into the valve housing and thence to the discharge line 83.

Secured to the upper surface of a flange 105 on the sleeve 103, by means of screws 123, is a conventional fluid operated, spring biased, ball type pressure relief valve generally indicated at 125. The upper end of valve 125 is provided with a tapped recess 127 to receive a coupling member 129 by which a conduit 131 (see Fig. 8) may be connected to the valve. The opposite end of conduit 131 is connected to port 165 of a pressure control valve 133, illustrated in detail in Fig. 3.

The lower end of the valve spring 135 receives the reduced upper end of a plunger 139, and abuts against a flange 141, formed intermediate the ends of the plunger. Flange 141 in its uppermost position, as illustrated in Fig. 7, abuts an annular shoulder 142 in the lower end of the valve 125. The lower end of the plunger 139 is slidably supported in the bushing 117 and extends therethrough so as to abut the upper end of the reduced end portion 111 of the valve spool 85. Therefore, when the valve spool 85 is moved upwardly, the plunger 139 will compress the spring 135 against the valve ball 140 to thereby increase the pressure from the conduit 131 required to unseat the ball 140. The valve shoulder 142 is provided with a groove 143, which permits fluid to flow therethrough into the sleeve recess 119 even though flange 141 is seated against the shoulder. The force exerted by spring 135 can be altered by adjusting the position of the sleeve 103 within the housing 69, so as to adjust the pressure required to unseat the valve ball 140 for a given position of plunger 139.

The pressure control valve 133 which controls the pressure applied to the piston 20 of the press is of a more or less conventional type and is shown in detail in Fig. 3. The inlet port 147 of the valve 133 is connected to conduit 169 by a conduit 171. The opposed port 149 is shown as closed by means of a plug 151. The movable valve element 153 of the valve 133 is provided with a recess 154 in the upper end thereof to receive a relatively light spring 155, the upper end of which abuts against the valve housing to resiliently urge the valve element 153 downwardly to close the outlet port 157, which is connected to the tank 31. The movable valve element 153 is provided with a piston portion intermediate its ends, which fits the bore of the valve housing and is provided with a small bleed passageway 161. The space above the piston portion is connected by a passageway 163 in the valve housing to the port 165, which is previously explained is connected by conduit 131 to the pressure relief valve 125 mounted in the upper end of the valve unit 39.

It will be observed that the pressure supplied to valve 39 by the pump is always the same as the pressure acting on the lower side of the piston portion of valve element 153. Moreover, the valve element 153 will always assume a position in which the pressure acting on opposite sides of the piston portion is approximately equal (spring 155 being only of sufficient strength to insure closure of the valve when the pressure acting on opposite sides of the piston is equal). As a result, the pressure supplied to valve 39 and therefore to the cylinder 17 may be controlled by controlling the pressure acting on the upper side of the piston portion of valve element 153. This is accomplished by the pressure relief valve 125 in combination with the adjustable spool 85 of valve 39.

Valve 39, is shown in Fig. 7 with its spool 85 in the uppermost position, in which it connects the pump outlet to the upper end of cylinder 17 and the tank to the lower end of cylinder 17, and in which the spring 135 is compressed to its maximum extent. This results in the application of the maximum pressure to the upper end of the cylinder. When the handle 61 and pedal 65 are fully released spool 85 is shifted by spring 113 to a position in which the pressure supply groove 77 is connected to groove 75 while groove 79 is connected to groove 81. At this time the upper end of spool 85 is entirely out of contact with plunger 139 and flange 141 rests against the flange of bushing 117. This effects upward movement of the head 19 at minimum pressure. As the handle or pedal 65 is progressively depressed, the spool 85 moves upwardly and eventually connects groove 77 to groove 79 and groove 75 to groove 73. This connection is definitely established when the notches 94 in lands 89 and 91 are located just above the upper edges of grooves 75 and 79 respectively. At this time the end of spool 85 has just contacted but has not moved plunger 139 from the position in which flange 141 contacts the flange of bushing 117. Under these circumstances the press head will exert its minimum downward pressure. As the handle 61 or pedal 65 is further depressed, no change in the fluid connections occurs, but spring 135 is progressively compressed, thereby progressively increasing the pressure exerted by the head 19. Thus by movement of a single control element in one direction the press may be caused to move downwardly and the amount of pressure controlled by the extent of movement of the element.

The line 175 which supplies the lower end of cylinder 17 contains a conventional foot valve which provides sufficient resistance to discharge of fluid from the lower end of the cylinder to prevent the head 19 and associated parts from falling by gravity, but which offers no resistance to flow into the cylinder. The cylinder 17 is also preferably provided with an auxiliary exhaust line 174 which is located midway between the ends of the cylinder and which is in unrestricted communication with the tank at all times. The piston 20 is made of a length just less than one-half of the length of the interior of the cylinder so that it exposes the exhaust line 174 when the piston reaches either end of the cylinder. This provides an automatic pressure relief which will prevent application of a heavy force by the piston against either end of the cylinder and makes it unnecessary to shift the reversing valve to a neutral or reversed position when the piston reaches the upper end of the cylinder.

A conventional pressure gauge 179 is connected to the valve 133 to read the pressure therein so that the operator of the press can easily control the same. A conventional needle valve 181 is connected between the gauge and the valve 133 to permit the fluid to be shut off from the gauge 179 when it is not desired.

A further embodiment of the invention is illustrated in Figs. 4, 5, 6 and 9. In this embodiment a conventional four-way valve 132 is employed for controlling the direction of movement of the piston 20. A separate conventional pressure relief valve is provided for operating the pressure control valve 133 rather than a combined valve unit, such as the unit 39 previously described, which performed the functions of both a four-way valve and a pressure relief valve. Due to the valve arrangement of this embodiment a modified linkage construction is required in order to operate the valves through a single means, such as the handle 61 or foot pedal 65 in the manner previously described. The remainder of the straightening pressure construction is substantially identical with that previously described, and corresponding part numbers refer to like parts of both embodiments.

Figure 4:
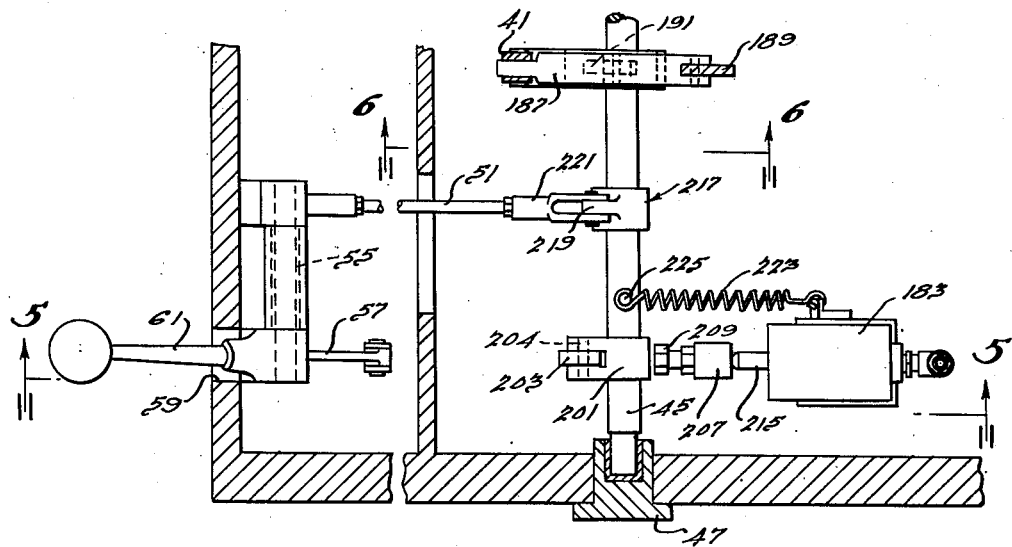
Fig. 4 is an enlarged view partially in section and partially in elevation of a further embodiment of the invention taken along the line 4—4 of Fig. 1.

The four-way valve 132 for controlling the direction of movement of the piston 20 is located in substantially the same position as is the valve unit 39 of the previous embodiment. As can be seen in Figs. 4 and 5, a conventional pressure relief valve 183 for operating the pressure control valve 133 is fixedly secured to a frame member 185 disposed below and extending rearwardly of the worktable 25. The linkage for controlling the movement of the pressure relief valve 183 and the conventional four-way valve is in part the same as the linkage previously described. The rod 41, which is connected to the lower end of the movable valve element of the four-way valve, is pivotally connected at its lower end to a generally channel-shaped lever member 187, the rearward end of which is pivotally connected to a bracket 189, which in turn is fixedly connected to the frame 13 of the press. Intermediate the ends of the lever 187 a roller 191 is rotatably mounted on a shaft 192 which is fixedly supported by the lever 187. Keyed to the shaft 45, which is rotatably mounted in the frame bushings 47, and disposed directly below the roller 191, is a cam element generally indicated at 193. The cam 193 is provided with a cam surface 195 and an arcuate dwell surface 197 extending rearwardly therefrom, which is coaxial with the shaft 45. As the shaft 45 is rotated in a clockwise direction, as viewed in Fig. 6, the cam surface 195 will move the lever arm 187 upwardly and thus raise the rod 41 to actuate the movable valve element within the four-way valve, in the manner described for the previous embodiment. When the cam element 193 is rotated further the lever roller 191 will ride on the dwell surface 197, and the position of the rod 41 and movable valve element will not be affected. The extreme forward end of the cam surface 195 is provided with a shoulder or flange 199 adapted to act as a stop to limit the counter-clockwise movement of the cam element.

Likewise keyed to the shaft 45 and laterally spaced from the cam element 193 is a lever 201 which has a roller 203 rotatably mounted on a pin 204 fixed in the upper end thereof. It will be noted that the lever 201, as seen in Fig. 5, is keyed to the shaft 45 in an inclined position for a reason which will be hereinafter brought out.

Pivotally connected to the body of the pressure relief valve 183 by means of link 205 is an arm 207, the upper end of which has a forwardly projecting abutment element 209 adapted to engage the roller 203 on the lever 201. Above the link 205 the arm 207 is pivotally connected to a yoke carried by the extremity of the valve-operating plunger 215 which projects forwardly from the valve housing and which corresponds in function to the plunger 139 of the preferred embodiment of the invention.

The shaft 45 has a collar 217 secured thereto between the cam element 193 and the lever 201. The collar is formed with a boss 219 which is pivotally connected to a yoke 221 mounted on the end of the previously described link 51. The forward end of the link 51 is fixedly connected to the short shaft 55 which is operably connected to the handle 61 and the foot pedal 65. A tension spring 223 is connected to the body of the pressure relief valve 183 and to a pin 225 on the shaft 45 to aid in rotating the shaft 45 when the latter is actuated by the handle 61.

In operation, when the handle 61 is pulled downwardly, it causes the shaft 45 to rotate in a clockwise direction. When this occurs, the cam surface 195 on the cam element 193 moves the rod 41 upwardly to shift the four-way valve into the position in which it affects downward movement of the press. After the cam surface 195 has passed over the roller 191, the dwell surface 197 contacts the roller so that further rotation of the shaft 45 will not affect the rod 41 and the four-way valve. The lever 201 which is mounted on the opposite end of the shaft 45, due to its inclined position, will not contact the abutment 209 on the upper end of the pressure relief valve arm 207 until the four-way valve has been thus shifted. Thereafter, further movement of the handle 61 downwardly will cause the roller 203 on the lever 201 to abut the upper end of the arm 207 and move it rearwardly so as to actuate the pressure relief valve plunger 215. The operation of the pressure relief valve 183 can thus be controlled and varied without affecting the four-way valve due to the dwell surface 197 on the cam element 193 and will control the pressure control valve 133 in the manner described in connection with the previous embodiment.

I claim:

A combined reversing and pressure relief valve unit including a valve housing having a longitudinal cylindrical bore therethrough, a movable valve element axially slidable in said housing bore, a plurality of bore-fitting axially spaced cylindrical lands formed on said stem, the wall of said bore having a plurality of axially spaced annular ports therein controlled by the lands on said movable valve element, said lands being of a shorter length than the distance between certain of said bore ports to permit overtravel of said lands between said ports without affecting the flow of fluid through the latter when the element establishes one set of connections, a spring biased ball-type pressure relief valve connected to said housing and communicating with said housing bore, a sleeve connected to said housing for adjustment axially of said valve element, and an axially slidable plunger within said sleeve, one end of which is adapted to be actuated by said movable valve element during said overtravel movement of the element and the opposite end of which engages said relief valve spring and is adapted to compress the latter when said plunger is moved by said movable valve element, whereby by adjusting said sleeve the amount of compression of said relief valve spring by said overtravel movement of said valve element may be varied.

BENEDICT WELTE.

REFERENCES CITED

The following references are of record in the file of this patent:

UNITED STATES PATENTS

| Number | Name | Date |
|---|---|---|
| 837,429 | Snyder | Dec. 4, 1906 |
| 1,921,955 | Vickers | Aug. 8, 1933 |
| 2,197,428 | Erb | Apr. 16, 1940 |
| 2,243,364 | Trautman | May 27, 1941 |
| 2,316,926 | Willett | Apr. 20, 1943 |
| 2,368,628 | Bates | Feb. 6, 1945 |
| 2,392,421 | Stephens | Jan. 8, 1946 |
| 2,426,411 | Peterson | Aug. 26, 1947 |